United States Patent
Goh et al.

(10) Patent No.: US 6,466,945 B1
(45) Date of Patent: Oct. 15, 2002

(54) ACCURATE PROCESSING THROUGH PROCEDURE VALIDATION IN SOFTWARE CONTROLLED ENVIRONMENT

(75) Inventors: Carol Gual Choo Goh, Singapore (SG); Soon Chen Tok, Singapore (SG); Kin Wai Tang, Singapore (SG); Tanit Sakikaew, Singapore (SG)

(73) Assignee: Chartered Semiconductor Manufacturing Ltd, Singapore (SG)

( * ) Notice: Subject to any disclaimer, the term of this patent is extended or adjusted under 35 U.S.C. 154(b) by 0 days.

(21) Appl. No.: 09/467,118

(22) Filed: Dec. 20, 1999

(51) Int. Cl.⁷ .............................................. G06F 17/30
(52) U.S. Cl. ........................... 707/102; 707/2; 707/9; 707/101; 707/202
(58) Field of Search ................... 707/2, 101, 102, 707/103, 9, 202; 395/575; 364/468; 382/149

(56) References Cited

U.S. PATENT DOCUMENTS

| | | | |
|---|---|---|---|
| 5,226,158 A | * 7/1993 | Horn et al. ................. 707/101 |
| 5,305,221 A |   4/1994 | Atherton .................... 364/468 |
| 5,398,336 A | * 3/1995 | Tantry et al. ............... 707/103 |
| 5,404,502 A | * 4/1995 | Warner et al. .............. 395/575 |
| 5,469,361 A | * 11/1995 | Moyne ........................ 364/468 |
| 5,548,756 A | * 8/1996 | Tantry et al. ................ 707/103 |
| 5,777,876 A |   7/1998 | Beauchesne ........... 364/468.01 |
| 5,826,268 A | * 10/1998 | Schaefer et al. ................ 707/9 |
| 5,861,881 A |   1/1999 | Freeman et al. ............ 345/302 |
| 5,870,762 A | * 2/1999 | Lee ............................ 707/202 |
| 5,873,075 A | * 2/1999 | Cochrane et al. .............. 707/2 |
| 5,886,896 A |   3/1999 | Lantz et al. ........... 364/468.23 |
| 5,933,820 A | * 8/1999 | Beier et al. .................... 707/1 |
| 5,937,410 A | * 8/1999 | Shen ......................... 707/103 |
| 5,956,706 A | * 9/1999 | Carey et al. ................... 707/2 |
| 5,966,459 A | * 10/1999 | Chen et al. ................ 382/149 |
| 6,065,017 A | * 5/2000 | Barker ....................... 707/202 |
| 6,256,637 B1 | * 7/2001 | Venkatesh et al. .......... 707/103 |
| 6,260,044 B1 | * 7/2001 | Nagral et al. ............... 707/102 |

* cited by examiner

*Primary Examiner*—Charles L. Rones
*Assistant Examiner*—Thuy Pardo
(74) *Attorney, Agent, or Firm*—George O. Saile; Rosemary L. S. Pike

(57) ABSTRACT

A new method is provided to enter data into a computer controlled equipment control system. The data that are entered into the system by human intervention are validated against a reference or golden database. The golden database contains only data that is certified and correct. Any errors that may have been created as part of the process of human entry of the data will therefore be identified and can be eliminated.

17 Claims, 1 Drawing Sheet

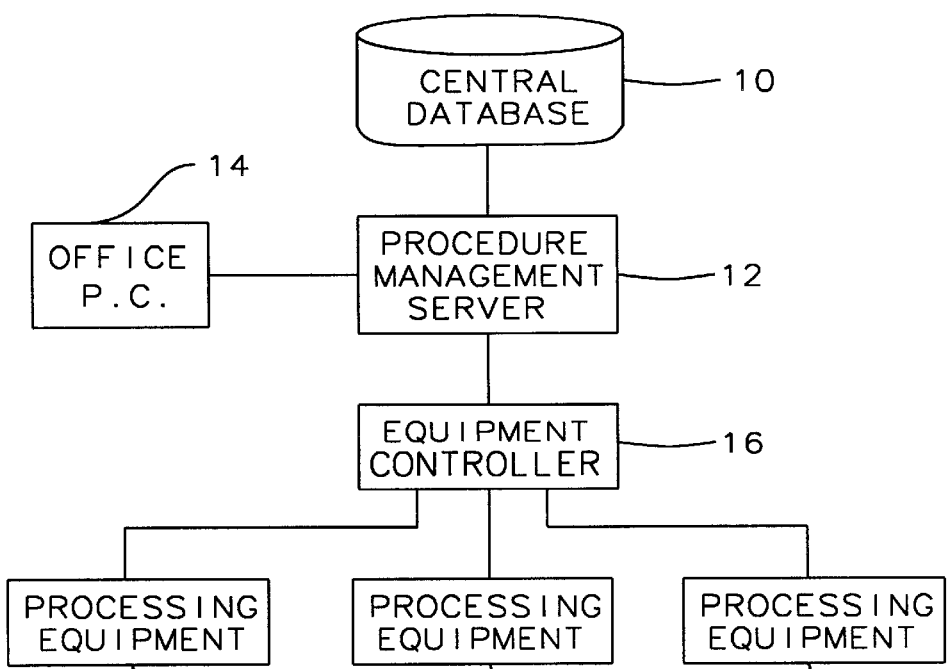
FIG. 1 - Prior Art
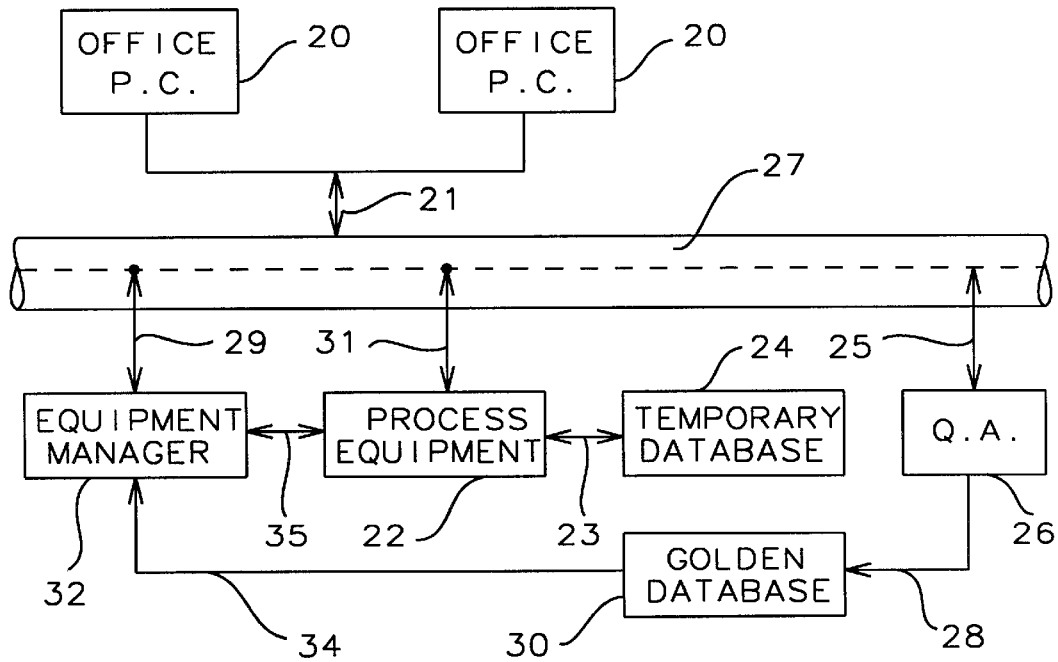
FIG. 2

ACCURATE PROCESSING THROUGH PROCEDURE VALIDATION IN SOFTWARE CONTROLLED ENVIRONMENT

BACKGROUND OF THE INVENTION (1) Field of the Invention

The invention relates to the fabrication of integrated circuit devices and more particularly, to a procedure for the correct and well controlled processing of batches or lots of semiconductor devices.

(2) Description of the Prior Art

The fabrication of semiconductor devices requires not only advanced equipment that is used to execute processing steps that are of a most advanced and advantageous nature, it also requires that the processing steps are scheduled in a precise and well-controlled manner. Most modern semiconductor manufacturing facilities have long since converted to systems that are computer controlled, whereby every step of the manufacturing process is scheduled and executed under the control of sophisticated support software. Such systems are known in the industry under a range of acronyms. Some of these acronyms have practically become industry standards and are marketed as individual support packages to control major sections of a semiconductor manufacturing facility. Other software support packages are in house designs that may or may not have proven to live up to high levels of expectations of control and efficiency of operation. Many of these software programs are of an extremely sophisticated nature and are used for instance for high speed product testing. Other software support packages are available for controlling processing parameters while the various processing steps that are required to create semiconductor devices are being executed. One problem with the latter equipment is that it is often very difficult to predict and to therefore control the impact that various processing conditions have on the actual processes that are being performed while this lack of insight is exacerbated by the lack of insight in the inter-reaction and inter-dependence of many of the processing parameters and environmental conditions.

Where many of the available and implemented software packages address product manufacturing or product testing, that is the physical behavior of the product either during production or after is has been completed, there also exists a wide body of support software that concerns itself with scheduling and control of the product while it is being manufactured. These software packages are in the broadest scope known as Management Information Support (MIS) packages. These programs in the strict sense control the flow of the product through the manufacturing line. This is in most cases however not the limit of the functions of these programs. The limited scope of this software can readily be extended to the point where the flow of the product is connected with and has an impact on product scheduling, yield analysis, financial and cost analysis and a host of other inter-related disciplines that all provide better insight and control in managing a modern semiconductor manufacturing operation.

The centralized control of these packages in many cases results in large databases that contain related information. For instance, many of the support software programs that are implemented in a semiconductor facility are aimed at and dedicated to the numerical control of production equipment. The equipment may of a specific type, such as an etch or plasma chamber, or it may be a high speed tester that is dedicated to testing a variety of devices and whereby the test data is contained on the separate database from where it is loaded to the tester upon request by the tester. All of this under software control and without the help of human intervention. An important feature of equipment control is that the equipment provides status and progress information to its supporting software, this information can in turn be used to for instance re-schedule production runs on a piece of equipment or to conclude from test results that a condition exist in the manufacturing steps that requires human intervention. Where this support software is typically very sophisticated and autonomous, it is in most cases still required that human intervention can be exercised. For instance, initial scheduling of a batch lot processing is typically done via terminal where an operator inputs the required parameters. These parameters can be lot numbers, part numbers, specific test requirements, environmental processing parameters for a particular piece of equipment, etc. There also may be a broad separation of types of equipment that are being used. Most equipment in a manufacturing facility is aimed at producing product. It is thereby however also feasible that computer-controlled equipment is aimed at Research and Development (R&D) functions. The requirements that are typically placed on the latter type of equipment may well differ considerably form the requirements that are placed on production equipment even though the technical capability of both types of equipment may be the same.

One of the major problems that is frequently experienced when using computer controlled equipment is human error. Where data is entered by human intervention, there is always the possibility that errors are made and entered into the system. These errors can be very costly and can also be very difficult to detect. It is clear that the best way to enter data into a computer system is to have some way of validating the entered data at the time that the data is entered. The basic method that is used to perform this validation should, ideally, not require human intervention. It should be a validation whereby the data that is entered is, whenever possible, validated against reference data. This data is frequently referred to as golden data in the sense that this data represents the uncontested correct information.

The invention addresses problems of data integrity of equipment data that is contained within and managed by a computer-controlled system.

SUMMARY OF THE INVENTION

A principle objective of the invention is to assure that data that is used by semiconductor processing equipment is correct and uncorrupted.

It is another objective of the invention to provide a data repository for a computer controlled system that contains valid reference data for equipment scheduling and operation.

Another objective of the invention is to eliminate human error from data that is entered into a system where semiconductor equipment is under computer control.

Yet another objective of the invention is to prevent data corruption of data that is stored on computer controlled databases.

A still further objective of the invention is to prevent the scrapping of product as a result of incorrect data that is stored on a computer controlled system.

In accordance with the objectives of the invention a new method is provided to enter data into a computer controlled equipment control system. The data that are entered into the system by human intervention are validated against a reference database. The reference database contains only data that is certified and correct. Any errors that may have been created as part of the process of human entry of the data will therefore be identified and can be eliminated.

BRIEF DESCRIPTION OF THE DRAWINGS

FIG. 1 shows a systems overview of the conventional data entry and control environment.

FIG. 2 shows a systems overview of the data entry and data management of the invention.

DESCRIPTION OF THE PREFERRED EMBODIMENTS

Referring now specifically to FIG. 1, there is shown a systems overview of the conventional data entry and control environment. This system is part of a Computer Integrated Manufacturing (CIM) environment where all data that relates to semiconductor equipment operation resides in a central database 10. The specifics as to type of semiconductor equipment are not germane to the invention. The term semiconductor equipment can be used in the broadest scope of its meaning and can include processing equipment (18), test equipment and the like. The equipment includes all types of equipment that is used in a semiconductor manufacturing and research environment and is not limited to production equipment but can for instance include equipment that is used for R&D purposes. The central piece of software in the system configuration of FIG. 1 is the Procedure Management Server 12. This software interfaces as follows:

it can accept and process entries that are made (via for instance a data processing terminal) by an operator it can access the central database for either data storage or data retrieval, and it can interface with the equipment group controller 16.

The central database 10 is in principle simple of design, it stores and retrieves all data that relate to equipment operations. This data is identified by a record or equipment identification (ID) number. The content of the data that is contained within the central database is not germane to the invention whereby however it may be of benefit to point out that this data can contain any data that relates to the operation of a piece of equipment in the broadest scope. Directly needed for the operation of a piece of equipment that is used in a semiconductor manufacturing facility are the numerical control data that control the performance of the primary function by the piece of equipment. Also contained within data records can be data that relates to processing events (when and what operation is executed, the results of the operation, why the operation is executed, who/what initiated the execution of an operation and the like) or data that relates to the environment within which the piece of equipment operates (who or what triggered an event, data relating to equipment that precedes and/or follows a particular piece of equipment, operator entry password protection, time stamps, maintenance schedules and the like).

The Procedure Management Server 12 performs, among others, the function of tracking the data content of the database 10. One of the main functions of the Procedure Management Server 12 is to manage the auxiliary storage that is provided to the system by database 10. It stores, by ID, equipment information and keeps track of where this information is stored, it allocates disk space for new ID records that are entered, it eliminates from the database 10 those equipment records that are purged from the system and re-allocates the vacated space on the database, it performs database verification routines that assure that space on the database in available, to what extent the database has been filled with data and how much data can therefore as yet be entered into the database.

The Procedure Management Server can also interface with human or operator entries 14 and as such has all the typical performance parameters of such support such as identify human operator by code and password, register time of the day and date of entries, perform error checking routines that relate to typing errors or other more sophisticated input screening functions, record and analyze entries made via human entry. One of the main functions of the Procedure Management Server is to accept and to pass on to the central database 10 the equipment information that is manually entered by the operator 14. The item highlighted as 14 does therefore not only represent the (mechanical or data processing) means of accessing the Procedure Management Server but also represents the operator who performs the data entry.

As a final function of the Procedure Management Server, this software package interfaces with the Equipment Group Controller 16. The Equipment Group Controller 16 feeds equipment-related data directly to the equipment in question and under control of commands that are entered via terminal 14. Typically, these data are supplied to the equipment based on the equipment type and simultaneously (to multiple pieces of equipment) for one type of equipment. Additional functions of the Equipment Group Controller 16 are status control and recording of the equipment that is managed by it such as time and date of data loading (to the equipment), recording and analyzing data feedback from the equipment, recording operator ID by request for data transfer.

The key deficiency of the system configuration that is shown in FIG. 1 is that there is no way that the data that are entered via the operator 14 is verified against a reference or standard data. Operator error is therefore directly passed on to the database from where it is loaded upon request to the designated equipment. It is clear that this can lead to time consuming and expensive errors in operating the equipment. Not only will it not be known that potentially incorrect data has been loaded into the equipment but it may also require a significant amount of time before it is realized that a particular piece of equipment is operating using the wrong data. Once the error is detected, it may require considerable research and time to determine the effect that this error may have had on immediately proceeding operations of the equipment. A better method of providing data to the equipment must therefore by designed.

FIG. 2 addresses the data processing sequence of the invention. Key to this procedure is the implementation and use of a reference of golden database. The data that is contained within this database has been extensively verified through either detailed analysis or extensive use and is therefore assumed to be without errors.

Another difference with the conventional method of operation is that the process engineer enters the equipment information directly to each piece of equipment, the pieces of equipment may be grouped together if these pieces of equipment are functionally identical so that the process engineer makes one entry for a particular type of equipment (which may in fact by directed at several pieces of equipment where however these pieces of equipment are identical).

The process of the invention proceeds as follows, interconnect 27 indicates the ethernet that provides access to the CIM network:

the new equipment data is entered via connection 21, that is the office network interconnect, by the process engineer 20 to the equipment 22, this may be one entry for several pieces of equipment or one entry for a unique piece of equipment the new equipment data that has been entered by the processing engineer 20 is loaded into the temporary database 24, from the processing equipment 22 and under control of the processing engineer 20, via interconnect 23 the processing engineer raises an Engineering Change Notice (ECN), via interconnection 25, which alerts the Quality Assurance (QA) function 26. The QA function 26 can be a human operator but does not have to be a human operator. The QA function can be invoked under software control where it is however expected that a message is provided to a human operator in the QA organization notifying the QA operation of the occurrence of the event. The receipt of the ECN triggers the function 28 which is the activation of the golden record for that piece of equipment that is contained in the golden database 30 after the activation of the golden record, the golden record is downloaded to the Equipment Manager (32) software function using interface 34. This function 32 also has a copy of the new data record that it obtains directly (35) from the equipment 22 where the process engineer entered this new data record. The Equipment Manager 32 compares the new records that have been entered by the operator 20 (and that are identified with a record ID) with the records (of the same record ID) that are stored on the golden database 30. If the compare function of the Equipment Manager detects any difference between the new operator entry (from the temporary database 24) and the data contained in the golden database 30, the product will not be processed on the piece of equipment where is arrived. The Equipment Manager function 32 can communicate with the CIM network via interconnect 29, the process equipment can establish this communication via the interconnect 31.

The data that are validated by the compare function of the Equipment Manager 32 need not by restricted to numerical or other data that is required to control the equipment 22. It is for instance entirely conceivable that only certain operators are allowed to enter data for a particular piece of equipment. The compare function of the Equipment Manager 32 can therefore validate that only a certified operator made an entry for a particular piece or type of equipment. As another example, it may be required that a production run is not interrupted over a given period of time. If therefore an operator entry is made that conflicts with this requirement, the QA organization 26 can be notified of the occurrence of an interrupted production run, giving this organization the opportunity to resolve the conflict. There are a number of possible scenarios that lend themselves to further implementation and to further definitions of functions that can be implemented under the compare function of the Equipment Manager 32.

From the description that has been provided relating to FIG. 2, it is clear that the process of the invention provides the capability to:

enter equipment data into the CIM system, this data can be for one particular piece of equipment or it can be for a type of equipment validate that the data that has been entered into the system is correct.

The process of the invention can be broken down in two activities, the first activity relates to the creation of records by the process engineer on a central data processor, the second activity relates to the events that happen when a product is scheduled for processing and arrives at a particular piece of processing equipment. The following steps occur during these two activities.

1) Record Creation the process engineer enters the required records into a particular and designated piece of processing equipment the record that has been entered by the process engineer is uploaded by the process engineer to a temporary database the process engineer raises an Engineering Change (EC) notice, which alerts the Document Control Center (DCC) and Quality Assurance (QA) that a new data record has been entered into the temporary database.

2) Product Processing the product arrives at a particular piece of equipment the new data record that has been sent to the temporary file is compared with a golden data record that is stored in the golden file if the compare finds no differences between the new data record and the golden data record, the central processor starts processing the product if the compare finds that the new record does not agree with the golden record, processing for the product on the piece of equipment where the product arrived is cancelled.

To extract and highlight from the above:

the process engineer enters and is responsible for the new record that is entered into the system; he/she does however not schedule the execution of a product processing function; the new data record is temporarily stored in a (temporary) file QA activates the golden record at the time that the product is scheduled for processing the new record is downloaded from the temporary file to the processing equipment (at the time that QA activates the golden record) and further downloaded to a software compare function. This same software compare function is provided with a copy of the golden record. It performs the compare between the new record and the golden record the production run is cancelled if the software compare finds any discrepancy between the new record and the golden record.

Although the invention has been described and illustrated with reference to specific illustrative embodiments thereof, it is not intended that the invention be limited to those illustrative embodiments. Those skilled in the art will recognize that variations and modifications can be made without departing from the spirit of the invention. It is therefore intended to include within the invention all such variations and modifications which fall within the scope of the appended claims and equivalents thereof.

What is claimed is:

1. A method for accurately processing records in a computer controlled semiconductor manufacturing environment, comprising the steps of:

providing a central processing computer;

providing semiconductor-processing equipment;

providing a means of data entry into said central processing computer;

providing a means of communicating from said central processor to computer driven terminals;

providing a means of new record data entry into said semiconductor processing equipment, said new data entry comprising one entry for several pieces of semiconductor-processing equipment or one entry for a unique piece of semiconductor-processing equipment, said new data entry comprising but not limited to:
  (i) numerical control data or data that are required to control said semiconductor manufacturing equipment;
  (ii) operator certification data such that only certain operators are allowed to enter data for a particular piece of semiconductor manufacturing equipment, and
  (iii) production data assuring that a production cycle is not interrupted over a given period of time;
establishing a temporary database, said temporary database to contain said new data records;
providing a means for transferring said new data records from said processing equipment to said temporary database and visa versa;
establishing a golden or reference database said golden database to contain verified and correct reference data records for semiconductor manufacturing equipment scheduling and operation, said golden data base comprising but not limited to:
  (i) numerical control data or data that are required to control said semiconductor manufacturing equipment;
  (ii) operator certification data such that only certain operators are allowed to enter data for a particular piece of semiconductor manufacturing equipment, and
  (iii) production data assuring that a production cycle is not interrupted over a given period of time;
providing a means of activating records contained within said golden database;
providing the means for downloading golden records from said golden database to a software compare function;
providing the means for downloading said new data records from said processing equipment to a software compare function; and
providing said software compare function whereby said software compare function compares said new data records with said golden records thereby raising a signal if an unequal compare is encountered, thereby eliminating human error from data entered into said computer controlled semiconductor manufacturing environment, thus assuring that data being used by semiconductor processing equipment is correct and uncorrupted.

2. The method of claim 1 wherein said semiconductor processing equipment comprises all the equipment that is used in a semiconductor manufacturing environment thereby including direct manufacturing that is aimed at producing semiconductor products and functions of support for semiconductor processes that are not directly aimed at producing semiconductor products.

3. The method of claim 1 wherein said providing means of data entry into said central processing computer are data entry terminals such as Personal Computers that furthermore includes all means and methods that are applied to enter data into said central processor by manual entry.

4. The method of claim 1 wherein said central processor is not limited to one processor but where one or more software functions are executed using one or more distributed processors that may or may not interface each other or with one or more central processors.

5. The method of claim 1 wherein said means of communicating from said central processor to computer driven terminals is not limited to any particular type of interface between a computer and a human interface but where any means that is available to communicate from a computing system to a part of the computing system other than the central processor is applied as the means of communicating.

6. The method of claim 1 wherein said golden database contains records that are used as reference records whereby said reference records are assumed to be free of errors of any kind.

7. The method of claim 6 wherein said reference records are addressed and referenced by either user identification number or by equipment identification number.

8. The method of claim 6 wherein said reference records contain numerical control data for semiconductor manufacturing control data in addition to data of an environmental or operational nature and processing environment such as time of creation of the record, origin of record, originator of record, reason code for record creation, last access of record with reason code.

9. The method of claim 1 wherein said temporary database contains records that are retained in said database on a temporary basis whereby said records have not been validated as to errors or oversights within these records whereby the record format of said temporary records is essentially the same as the record format of said golden records.

10. The method of claim 1 wherein said providing a means for transferring said new data records from said processing equipment to said temporary database comprises a software support function that extracts data records that are identified by a standardized record identification header from said processing equipment and stores said data records onto said temporary database said storage to occur in such a manner that said records can be accessed and downloaded from said temporary database using the identical record identification that has been used to store said records onto said temporary database.

11. The method of claim 1 with the additional function of providing a means for loading new data records from said temporary database to said golden database thereby transferring data records from said temporary database to said golden database whereby said data records can be retrieved from said golden database using the identical record identification that was used to store said records onto said golden database.

12. The method of claim 1 with the additional function of providing an equipment management function that controls all aspects of semiconductor processing equipment whereby the bulk of said control relates to the management of the numerical control data that is required to operate said equipment whereby furthermore all relative data of equipment operation and environment of processing are and remain part of the data that are maintained by said equipment management function.

13. The method of claim 1 wherein said software compare function has the ability to compare digital data records whereby these data records originate from two different sources whereby the first of these source is said new data records while the second of these source is said golden record whereby furthermore said software compare function can raise a signal as soon as the compare indicates a discrepancy between the records that are submitted to it whereby furthermore said compare function provides further information regarding the nature of the discrepancy such as to where the discrepancy has been observed in addition to the records that caused the discrepancy.

14. The method of claim 1 wherein said means for activating said golden records comprises searching for said records that are contained in said golden database in addition to setting flags and any other data items of importance to assure that said activated records are contained within said golden database and that said records are available for access and transmission to other sub-components of said central processor.

15. The method of claim 1 wherein said means for downloading golden records from said golden database to said software compare function is the transmission and storage of said activated records from said golden database to an input buffer of said software compare function.

16. The method of claim 1 wherein said means for downloading new data records from said processing equipment to said software compare function is the transmission and storage of said activated records from said processing equipment to an input buffer of said software compare function.

17. The method of claim 1 wherein said raising a signal based on the outcome of results obtained by said software compare function is acknowledging and alerting the environment other that the internal operational environment of the central processor that an unequal compare has been found in comparing said new data records with said golden records thereby furthermore providing to said environment all relevant data that is obtained but said compare function that relate to and further identify said unequal compare.

* * * * *